(12) United States Patent
Spors et al.

(10) Patent No.: US 6,619,896 B1
(45) Date of Patent: Sep. 16, 2003

(54) DEVICE FOR DETACHABLY CONNECTING A TOOL

(75) Inventors: Benno Spors, Marbach (DE); Andree Fritsch, Freudental (DE); Uwe Kretzschmann, Bietigheim (DE)

(73) Assignee: Komet Praezisionswerkzeuge Robert Breuning GmbH, Besigheim (DE)

( * ) Notice: Subject to any disclaimer, the term of this patent is extended or adjusted under 35 U.S.C. 154(b) by 0 days.

(21) Appl. No.: 09/913,922

(22) PCT Filed: Feb. 12, 2000

(86) PCT No.: PCT/EP00/01166

§ 371 (c)(1),
(2), (4) Date: Aug. 17, 2001

(87) PCT Pub. No.: WO00/48776

PCT Pub. Date: Aug. 24, 2000

(30) Foreign Application Priority Data

Feb. 19, 1999 (DE) .......................... 199 07 026

(51) Int. Cl.⁷ .................................. B23C 3/00
(52) U.S. Cl. ...................... 409/234; 29/DIG. 56; 29/DIG. 94
(58) Field of Search ............... 409/234, 232, 409/231; 82/160; 279/91

(56) References Cited

U.S. PATENT DOCUMENTS

| | | | |
|---|---|---|---|
| 4,786,221 A | | 11/1988 | March |
| 4,834,596 A | * | 5/1989 | Hollifield et al. ........... 409/234 |
| 4,861,203 A | * | 8/1989 | Bassett et al. .............. 409/234 |
| 5,193,954 A | * | 3/1993 | Hunt ........................ 409/234 |
| 5,492,441 A | * | 2/1996 | Schuerfeld .................. 409/234 |
| 5,509,763 A | * | 4/1996 | Reinauer et al. ............ 409/233 |
| 5,683,212 A | * | 11/1997 | Cirino et al. .............. 279/2.11 |
| 5,711,642 A | * | 1/1998 | Ball et al. ................. 409/234 |
| 6,062,779 A | * | 5/2000 | Sugimura ................... 409/234 |

FOREIGN PATENT DOCUMENTS

| | | |
|---|---|---|
| DE | 40 24 645 | 3/1991 |
| DE | 42 28 558 | 8/1992 |
| DE | 41 27 661 | 2/1993 |
| DE | 196 50 481 | 6/1998 |
| EP | 0 507 147 | 10/1992 |
| EP | 0 512 217 | 11/1992 |
| GB | 437 388 | 10/1935 |
| WO | WO 95/16533 | 6/1995 |

* cited by examiner

Primary Examiner—A. L. Wellington
Assistant Examiner—Dana Ross
(74) Attorney, Agent, or Firm—Flynn, Thiel, Boutell & Tanis, P.C.

(57) ABSTRACT

The tool has a tool shank (which may be hollow) (14), whilst the machine spindle has a connecting sleeve (20) containing a recess (18) to accommodate the tool shank. A clamping mechanism (22) is located in the area between the tool shank (14) and the connecting sleeve (20). This mechanism has at least one clamping element (24"), with radial movement, which acts as a wedge drive, providing axial clamping movement between the tool shank (14) and connecting sleeve (20). The clamping mechanism comprises an actuating nut (26), which screws onto an exterior thread (28) on the connecting sleeve (20) and is coaxial in relation to the spindle axis. During the clamping procedure, the axial movement of the actuating nut can be converted into the radial movement of the clamping element (24"), with the help of at least one connecting link (30").

16 Claims, 8 Drawing Sheets

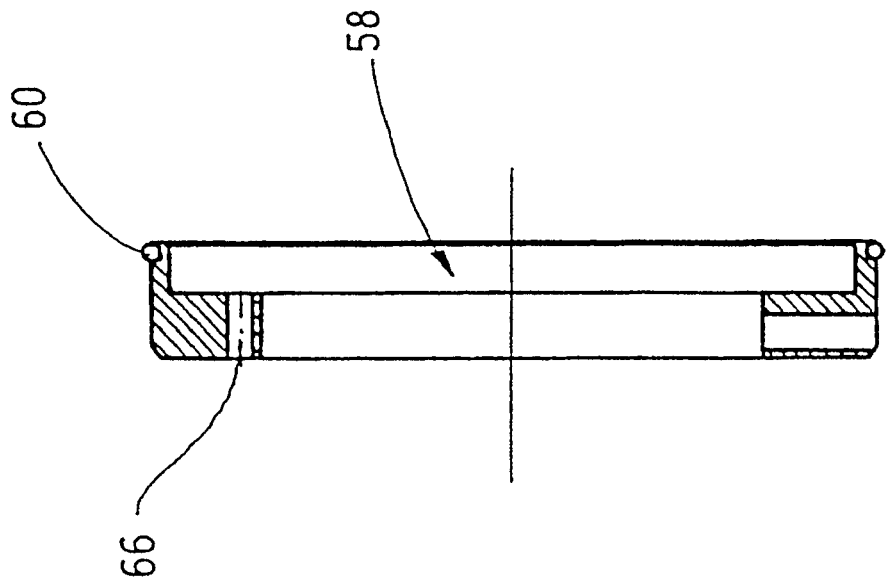
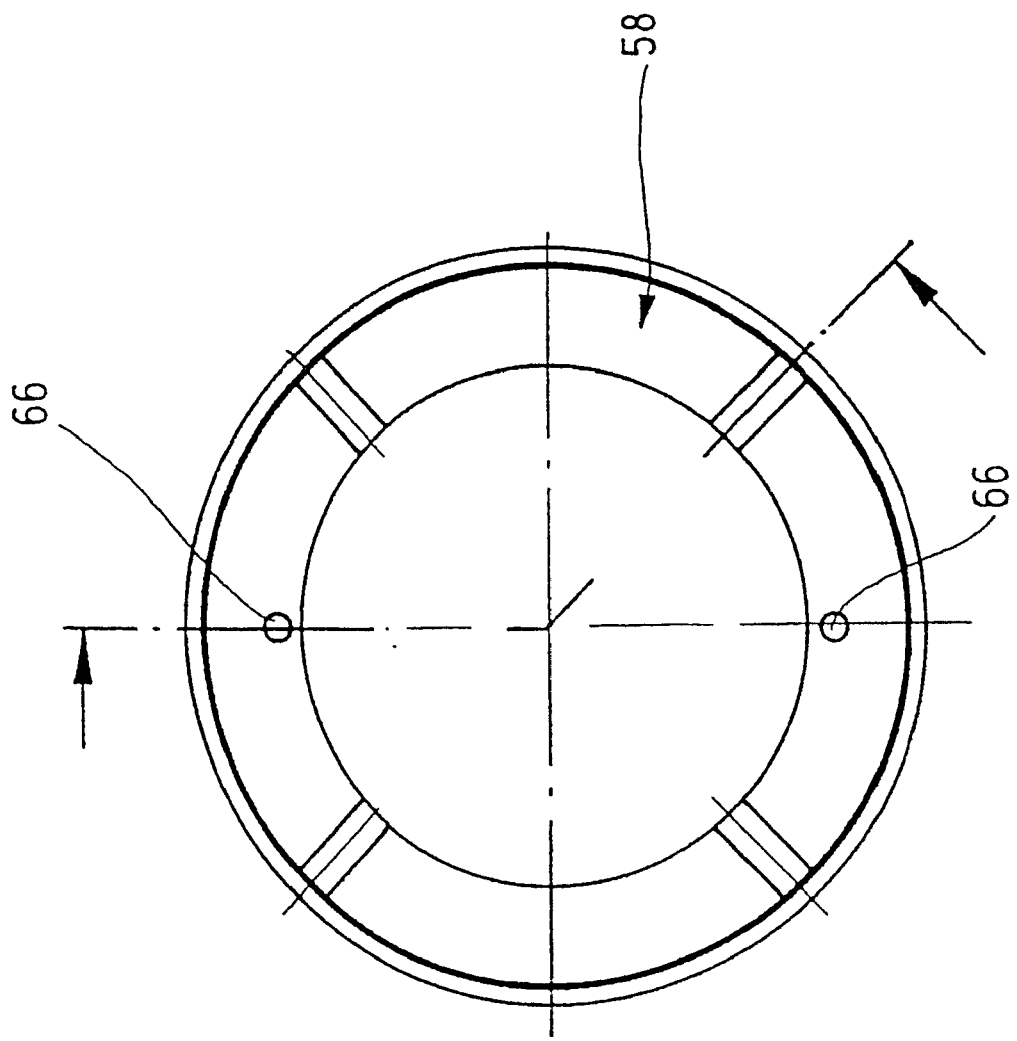
Fig. 4a
Fig. 4b

DEVICE FOR DETACHABLY CONNECTING A TOOL

BACKGROUND OF THE INVENTION

The invention relates to a device for releasably connecting a tool to a machine spindle, comprising a tool shank projecting on the tool, a connecting sleeve projecting on the spindle coaxially to the spindle axis and having a recess for accommodating the tool shank, and a clamping mechanism which engages in the region between tool shank and connecting sleeve and has at least one essentially radially movable clamping element, the radial movement of which can be converted, preferably in the manner of a wedge drive, into an axial clamping movement between tool shank and connecting sleeve. In this case, the connecting sleeve need not be arranged directly on the machine sleeve. It may also be arranged on an adapter piece which can be releasably connected to a machine spindle. On the other hand, the tool shank need not be arranged directly on the tool either. It may be formed by an adapter piece connected to the tool.

The task of the clamping mechanism engaging in the region between tool shank and connecting sleeve is to connect the tool to the machine spindle in a rotationally locked manner by means of the at least one radially movable clamping element. When the clamping element is actuated by means of a suitable actuating mechanism, its radial movement is converted into an axial clamping movement between tool shank and connecting sleeve. In the process, taper clamping and/or flat-face clamping occurs between the clamping faces, facing one another, of the tool shank and the connecting sleeve. Pull rods, for example, are used to actuate the clamping mechanism, these pull rods passing through the machine spindle and engaging in the tool shank and being actuated from the machine side. Furthermore, it is known to actuate the clamping elements by means of screws or plungers which can be actuated radially from outside. This type of actuation has the disadvantage that a preset orientation of the spindle is necessary in order to be able to get to the actuating screws. This disadvantage has an adverse effect in particular in the case of multi-spindle heads.

BRIEF SUMMARY OF THE INVENTION

Starting therefrom, the object of the invention is to improve the known device of the type specified at the beginning to the effect that it is possible to actuate the clamping mechanism independently of the machine without a specific orientation of the spindle being necessary for this purpose.

To achieve this object, the combination of features specified in patent claim 1 are proposed. Advantageous refinements and developments of the invention follow from the dependent claims.

The solution according to the invention is based on the idea that the clamping mechanism comprises an actuating nut which is screwed onto an external thread, coaxial to the spindle axis, of the connecting sleeve and the axial movement of which, during the clamping operation, with at least one intermediate member in between, can be converted into the radial movement of the clamping element. This measure achieves the effect that the clamping mechanism can be actuated via the actuating nut irrespective of the orientation of the spindle in the circumferential direction. In this case, the intermediate member is advantageously designed as a wedge drive. In order to achieve flat-face clamping between the tool shank and the connecting sleeve, it is advantageous if the tool shank is defined at its root by a radially projecting annular surface, against which the connecting sleeve can be pressed with its free end face under the effect of the clamping mechanism.

A preferred refinement of the invention provides for at least one clamping element to be designed as a clamping bolt which is radially guided in a guide bore passing through the sleeve wall of the connecting sleeve and has a wedge surface at its end projecting outward beyond the guide bore, and for the intermediate member to be designed as an axially displaceable intermediate ring which is arranged in a non-rotatable manner on the outside of the connecting sleeve between the actuating nut and the clamping bolt and has a wedge surface bearing against and complementary to the wedge surface of the clamping bolt. In this case, the wedge surface of the clamping element and/or of the intermediate member is expediently subdivided into a steeper adjusting bevel and a flatter clamping bevel with regard to the displacement direction of the intermediate member. The wedge surfaces of the intermediate ring may be defined by two lateral guide surfaces which face one another in the circumferential direction, are oriented in an axially parallel manner, laterally overlap the projecting end of the clamping bolt and in the process form an anti-rotation locking means for the intermediate member, the intermediate ring expediently being axially guided on the outer surface of the connecting sleeve outside the wedge surfaces defined by the lateral guide surfaces. An axial supporting bearing designed as a plain or rolling-contact bearing may be arranged in the abutting region between the actuating nut and the intermediate ring. This facilitates the axial displacement of the intermediate ring by the actuating nut. Furthermore, the actuating nut may carry an annular extension piece which axially overlaps the intermediate ring on the outside and may be integrally formed in one piece on the actuating nut or connected to the latter as a separate part, in particular screwed, adhesively bonded, brazed on or shrunk on. In order to facilitate the detaching operation, it is advantageous if the annular extension piece has a driver engaging behind the intermediate ring at an annular shoulder remote from the actuating nut. The risk of contamination from outside is reduced if an annular cap projecting radially beyond the connecting sleeve and fixed to the latter is arranged on that side of the guide bores which is axially opposite the actuating nut. In this case, the annular extension piece of the actuating nut may axially overlap the annular cap at its circumferential surface. A further improvement in this respect can be achieved if a radially acting sealing ring is arranged between annular cap and annular extension piece. In order to achieve antirotation locking of the clamping bolt in the guide bores, it is advantageous if the clamping bolt, on its guide surface opposite the wedge surface, has a radially oriented guide groove in which a guide pin projecting beyond the annular cap engages in an axially parallel manner.

In a further preferred refinement of the invention, the clamping bolt has a tapered extension bearing against an internal taper on the tool-shank side. In addition, the tool shank may have a transverse bore in which at least one floating bolt having an internal taper is arranged in a displaceable manner. In order to achieve flat-face clamping, it is advantageous if the internal taper on the tool-shank side and the tapered extension on the clamping-bolt side are offset axially in the clamping direction during the clamping operation. In a preferred refinement of this embodiment variant, the clamping mechanism has two clamping bolts which are of identical design, are radially guided in diametrically opposite guide bores of the connecting sleeve, are displaceable by the actuating nut via the intermediate ring provided with two diametrically opposite wedge surfaces and each engage by means of their inwardly pointing tapered extension in a respective end internal taper of the floating bolt.

A further advantageous embodiment variant of the invention provides for the at least one clamping element to be designed as a clamping claw which, at its one end, has an anchor part, which can be supported on an inner shoulder of the connecting sleeve, and, at its other end, has a claw part which reaches into a cavity of the tool shank and can be pivoted there into an inner recess, the claw part and the boundary wall of the inner recess having wedge surfaces which are complementary to one another and via which the radial movement of the claw part can be converted into an axial clamping movement between tool shank and connecting sleeve. In this case, the intermediate member is designed as a plunger which is arranged in a non-rotatable manner in the interior of the connecting sleeve and the tool shank, has a complementary wedge surface bearing against an inner wedge surface of the clamping claw and is axially displaceable indirectly via the actuating nut between a release position and a clamping position. In this arrangement, the actuating nut is expediently coupled to the plunger via a transverse bolt which passes through at least one elongated hole, oriented in an axially parallel manner, of the connecting sleeve, in which case the transverse bolt can pass through an elongated hole, oriented in an essentially axially parallel manner, in the clamping element. At least two clamping elements of said type arranged in the circumferential direction at equal angular distances from one another and designed as clamping claws are advantageously provided. In addition, the plunger may at the same time be designed as an ejector which is effective during the release operation and which for this purpose may have an ejector head bearing against an inner surface of the tool shank.

A preferred refinement of the invention provides for the transverse bolt to be mounted with its ends in a thrust ring which is guided in a non-rotatable manner on the connecting sleeve and in such a way as to be axially displaceable via the actuating nut. The thrust ring may have two diametrically opposite recesses for accommodating the transverse-bolt ends, in which case the thrust ring, which overlaps the transverse-bolt ends on the outside, can be connected in each case via a radial pin to the transverse-bolt ends.

A further advantageous refinement of the invention provides for the actuating nut to have an annular extension which axially overlaps the thrust ring and which, on that side of the transverse bolt which is axially opposite the actuating nut, can be rigidly connected to a pull ring driving the transverse bolt in the release direction. A supporting bearing designed as an axial plain or rolling-contact bearing can be arranged both between the actuating nut and the thrust ring and between the pull ring and the thrust ring.

A particular solution variant of the invention provides for the thrust ring to have a thread interacting with a thread of the actuating nut and coaxial to the actuating nut. The thrust ring expediently has an external thread interacting with an internal thread of the actuating nut. In this case, the thrust ring and a pull ring arranged on that side of the transverse bolt which is axially opposite the actuating nut may be rigidly connected to one another.

It is also advantageous in this embodiment variant that the wedge surface of the plunger and/or the associated wedge surface of the clamping claw has a steeper adjusting bevel and a flatter clamping bevel with regard to the displacement direction of the intermediate member.

A preferred refinement of the invention provides for the clamping claws to be arranged with axial clearance in a centering cage which has two pistons which are connected to one another by webs and each engage in a respective cylindrical recess of the tool shank and the connecting sleeve. In this case, the webs may be designed as coolant tubes which pass through the pistons and to which cooling lubricant can be admitted.

DESCRIPTION OF THE DRAWINGS

The invention is explained in more detail below with reference to the exemplary embodiments shown schematically in the drawing, in which:

FIGS. 4a and 4b show a plan view and a section of an annular cap of the coupling device according to FIG. 1;

DETAILED DESCRIPTION OF THE INVENTION

Figure 1:
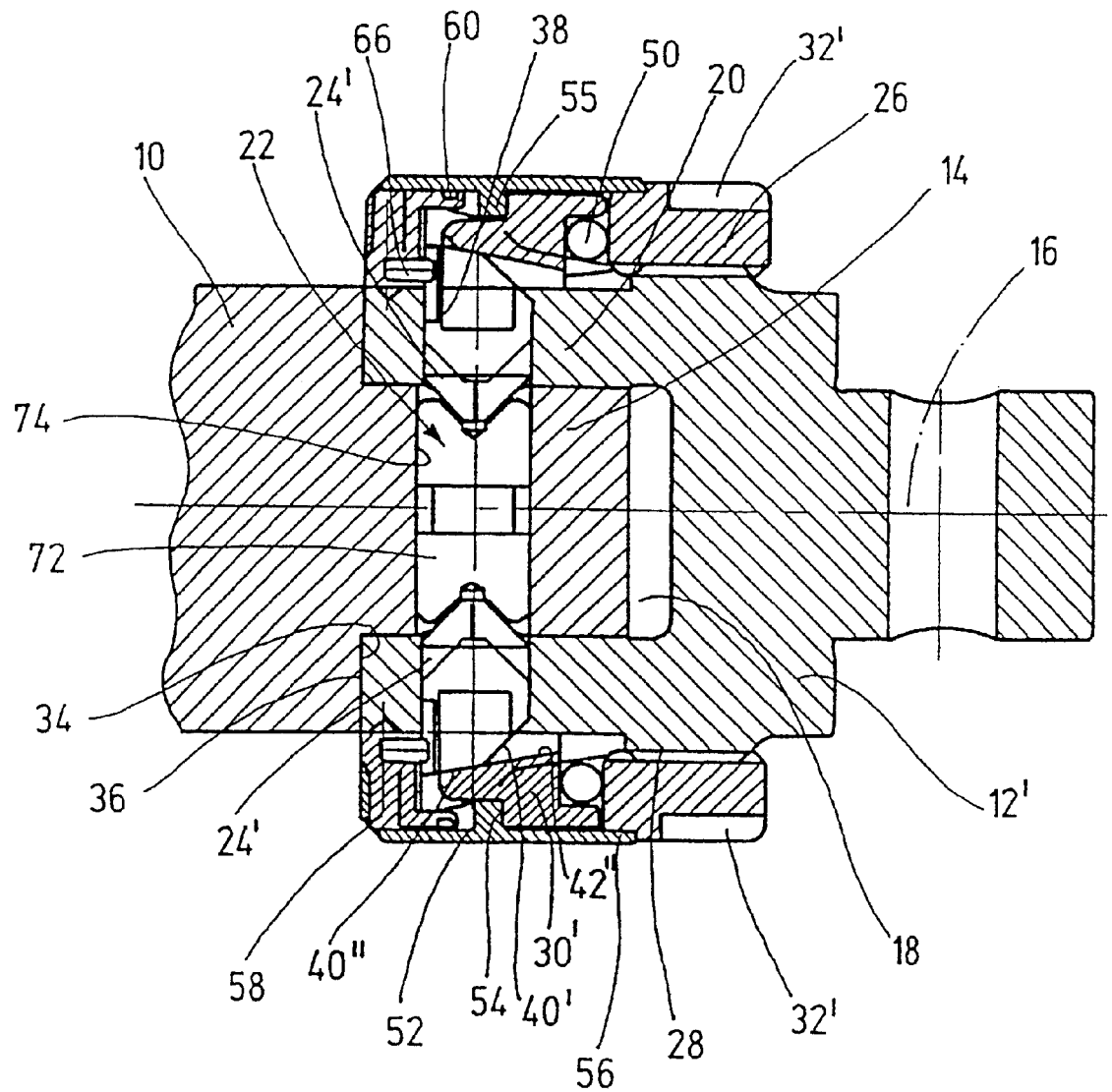
FIG. 1 shows a section through a tool coupling with actuating nut, an external wedge ring and clamping elements radially displaceable via the wedge ring.
Figure 2A:
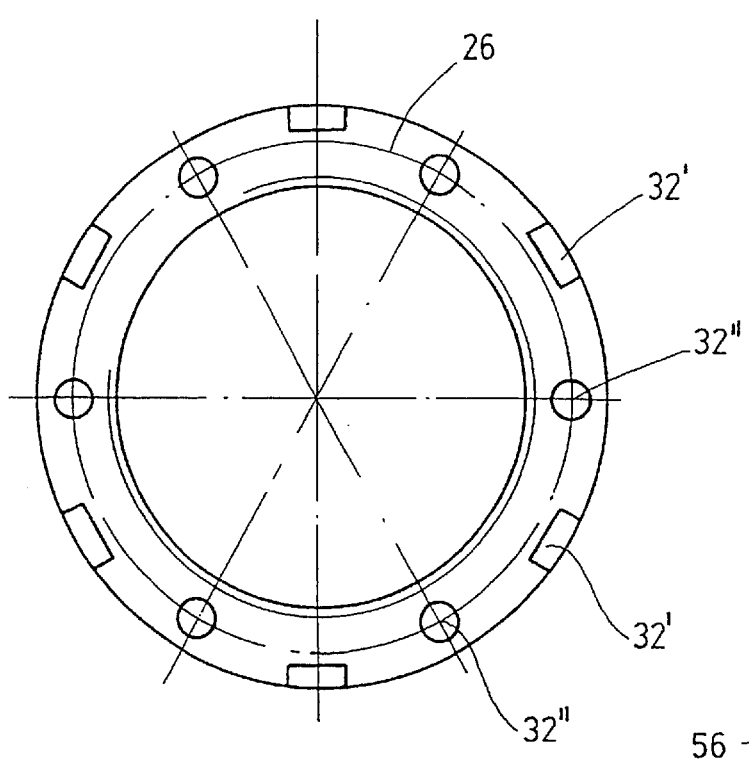
FIGS. 2a and 2b show a plan view and a sectional representation of the actuating nut.
Figure 2B:
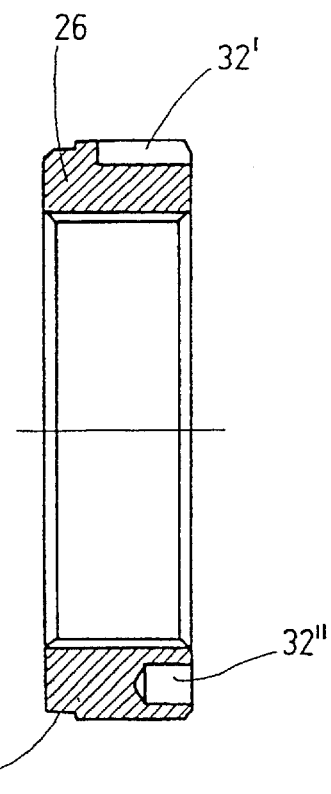
Figure 2C:
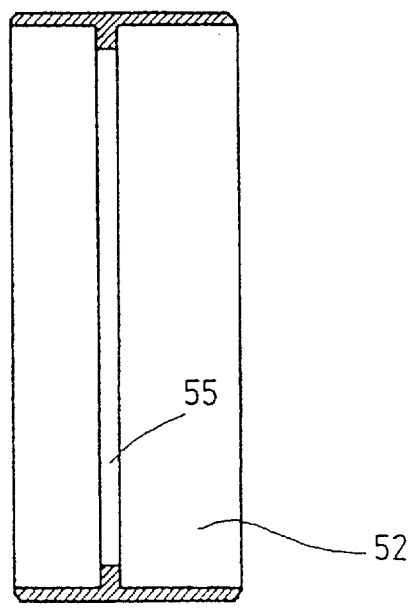
FIG. 2c shows a section through a driver ring which can be connected to the actuating nut.
Figure 3B:
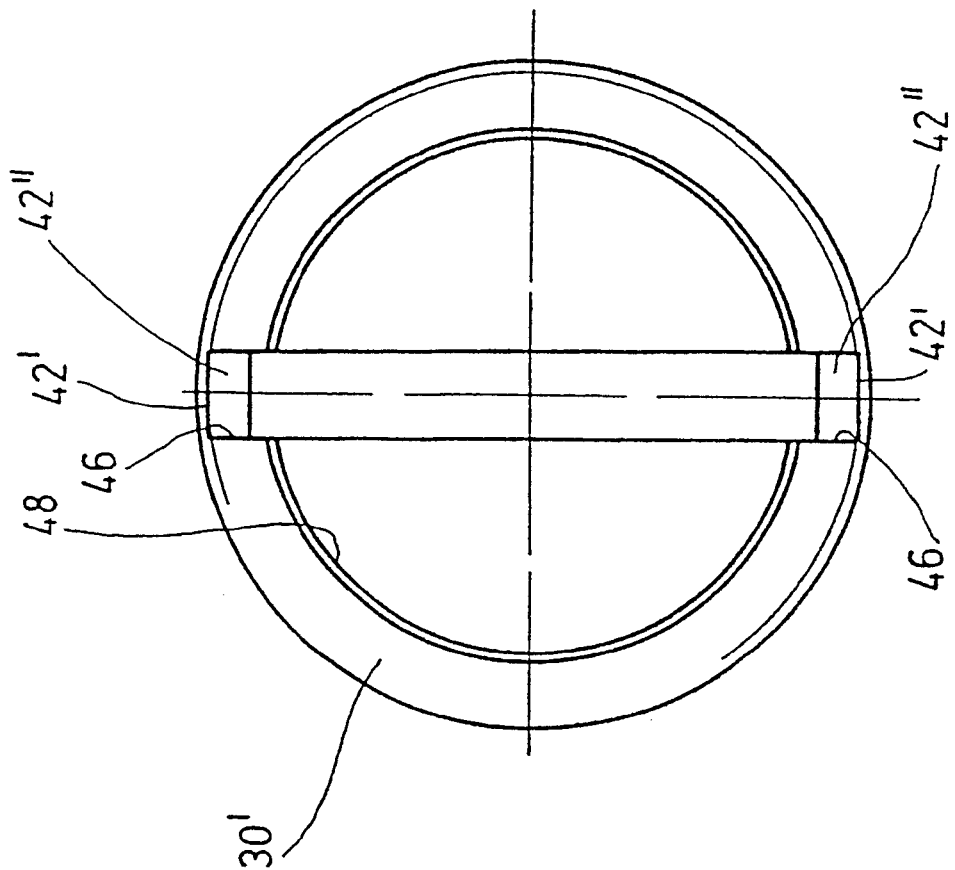
FIGS. 3a and 3b show a sectional representation and a plan view of the wedge ring according to FIG. 1.
Figure 3A:
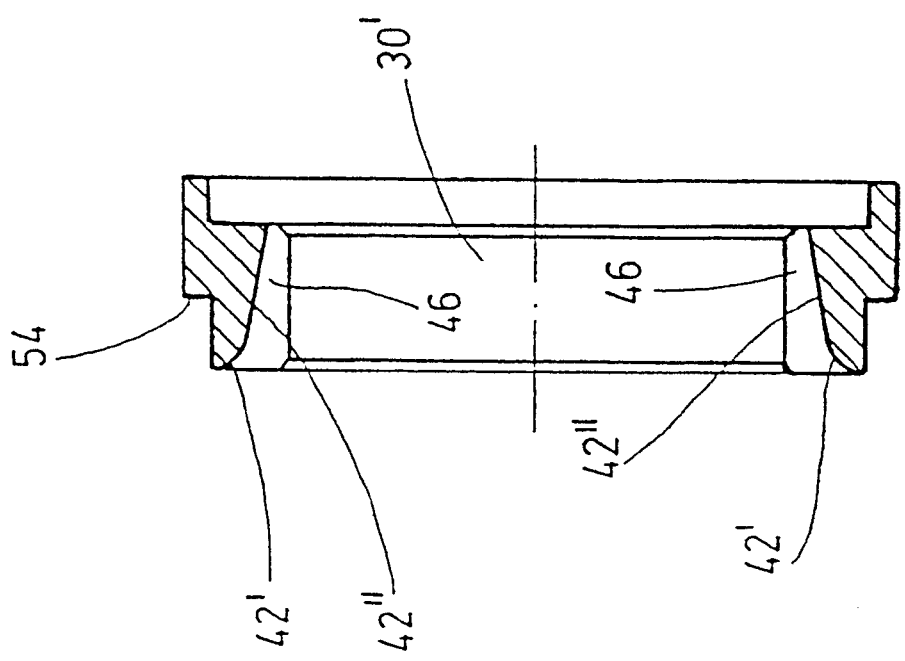

The coupling devices shown in the drawing are intended for connecting tools 10 or tool adapters to a preferably rotating machine spindle 12 or a spindle adapter 12'. For this purpose, the tool 10 has an axially projecting tool shank 14, whereas a connecting sleeve 20 projecting coaxially to the spindle axis 16 and having a recess 18 for accommodating the tool shank 14 is integrally formed on the machine spindle 12 or on the spindle adapter 12'. A clamping mechanism 22 is provided in order to produce the connection, this clamping mechanism 22 engaging in the region between tool shank 14 and connecting sleeve 20 and having at least one essentially radially movable clamping element 24', 24", the radial movement of which, in the manner of a wedge drive, can be converted into an axial clamping movement between the tool shank 14 and connecting sleeve 20. The clamping mechanism 22 comprises an actuating nut 26 which is screwed onto an external thread 28, coaxial to the spindle axis 16, of the connecting sleeve and the axial movement of which, during the clamping operation, with at least one intermediate member 30', 30" in between, can be converted into the radial movement of the at least one clamping element 24', 24". In all the exemplary embodiments shown in the drawing, the intermediate member 30', 30" forms a wedge drive, as will be explained in more detail below. In all the exemplary embodiments, engagement points 32', 32" for wrench actuation, in particular grooves 32' for a hook wrench or bores 32" for a pin wrench, are formed on the outside of the actuating nut 26. In addition, the outer circumferential surface may be provided with straight knurling 33 or diagonal knurling for providing a better grip.

In the exemplary embodiments shown in the drawing, the tool shank 14 is defined at its root by a radially projecting annular surface 34, against which the free end face 36 of the connecting sleeve 20, in the manner of flat-face clamping, can be pressed under the action of the clamping mechanism 22.

Two clamping elements 24' designed as clamping bolts are provided in the exemplary embodiment of a tool coupling shown in FIGS. 1 to 7, and these clamping elements 24' are guided radially in two guide bores 38 located diametrically opposite one another on the connecting sleeve 20 and passing through the sleeve wall and have a wedge surface 40', 40" at their ends projecting radially beyond the relevant guide bore 38. Here, the intermediate member 30' is designed as an axially displaceable intermediate ring which is arranged in a non-rotatable manner on the outside of the connecting sleeve 20 between the actuating nut 26 and the clamping bolt 24' and has a wedge surface 42', 42" bearing against and complementary to the wedge surface 40', 40" of the clamping bolt 24'. The wedge surfaces of the clamping element 24' and of the intermediate member 30' are subdivided into a steeper adjusting bevel 40' or 42', respectively, and a flatter clamping bevel 40", 42" with regard to the displacement direction of the intermediate member 30'. As can be seen in particular from FIGS. 3a and b, the wedge surfaces 42', 42" of the annular intermediate member 30' are defined by two lateral guide surfaces 46 which face one another in the circumferential direction, are oriented in an axially parallel manner, laterally overlap the radially projecting end 44 of the clamping element 24' and in the process form an anti-rotation locking means for the intermediate member 30'. Outside the wedge surfaces 42', 42" defined by the lateral guide surfaces 46, the annular intermediate member 30' is axially guided on the outer surface of the connecting sleeve 42 by a cylindrical surface 48. As can be seen in particular in FIG. 1, a supporting bearing 50 designed as an axial rolling-contact bearing is arranged in the abutting region between the actuating nut 26 and the annular intermediate member 30'.

The actuating nut 26 carries an annular extension piece 52 which axially overlaps the annular intermediate member 30' on the outside, has a driver 55 engaging behind the intermediate member 30' at an annular shoulder 54 remote from the actuating nut 26 and is connected in a rotationally locked manner to the actuating nut 26 at the location 56, preferably screwed, adhesively bonded, brazed or integrally formed. In addition, in order to prevent dirt from getting into the guide bores 38, an annular cap 58 projecting radially beyond the connecting sleeve 20 and fixed to the latter is arranged on that side of the guide bores 38 which is opposite the actuating nut 26, and the annular extension piece 52 of the actuating nut 26 axially overlaps this annular cap 58 at its circumferential surface. To further improve the sealing effect, a radially acting sealing ring 60 is arranged between annular cap 58 and annular extension piece 52.

Figure 5A:
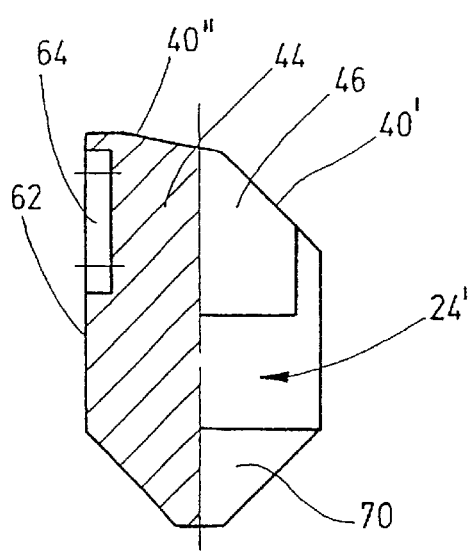
FIGS. 5a and 5b show two different side views (partly sectioned) of one of the clamping elements of the coupling device according to FIG. 1.
Figure 5B:
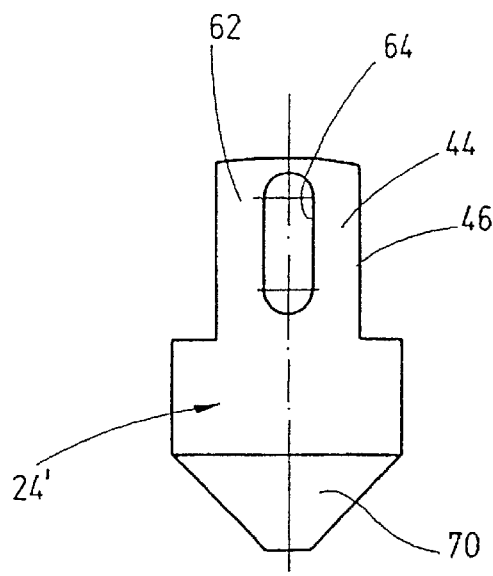
Figure 6B:
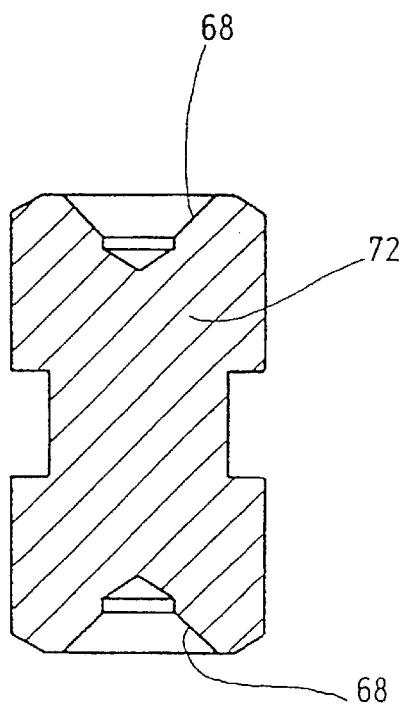
FIGS. 6a and 6b show a side view and a sectional representation of the floating bolt of the coupling device according to FIG. 1.
Figure 6A:
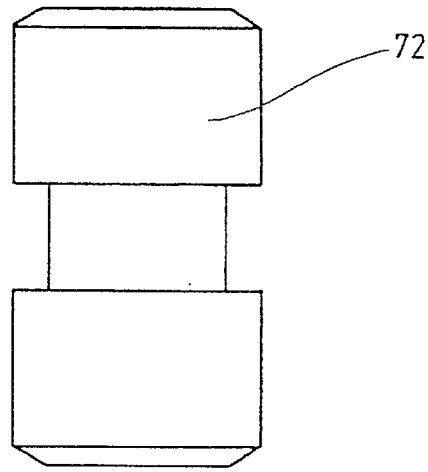

As can be seen from FIGS. 5a and 5b in conjunction with FIG. 1, the bolt-shaped clamping elements 24', on their guide surface 62 opposite the wedge surface 40', 40", have a radially oriented guide groove 64, in which a guide pin 66 projecting beyond the annular cap 58 in an axially parallel manner engages. Furthermore, the bolt-shaped clamping elements 24' have a tapered extension 70 bearing against an internal taper 68 on the tool-shank side. The two internal tapers 68 are arranged on a floating bolt 72 which is arranged so as to be displaceable in a transverse bore 74 of the tool shank 14. To achieve the above-mentioned flat-face clamping, the internal tapers 68 of the floating bolt 72 and the tapered extensions 70 on the clamping-element side are axially offset in the clamping direction during the clamping operation.

To release the tool 10 from the spindle adapter 12', the actuating nut 26 shown in the clamping position in FIG. 1 is slackened by rotating it about the spindle axis 16 until the clamping elements 24', with their tapered extensions 70, can be displaced radially outward completely out of the internal tapers 68 of the floating bolt 72. In this position, the tool shank 14 can be pulled axially out of the recess 18 in the connecting sleeve 20. The coupling of another tool is effected in the reverse order by first of all the tool shank 14 of the relevant tool 10, with actuating nut 26 slackened, being inserted into the recess 18 of the connecting sleeve 20 and then by the actuating nut 26, with the intermediate member 30' being displaced, being brought into the clamping position shown in FIG. 1.

In the exemplary embodiments of a tool coupling which are shown in FIGS. 7 to 9, the clamping elements 24" are designed as clamping claws which, at their one axial end, have an anchor part 82, which can be supported on an inner shoulder 80 of the connecting sleeve 20, and, at their other axial end, have a claw part 88 which reaches into a cavity 84 of the tool shank 14 and can be pivoted there into an inner recess 86. In this case, the claw part 88 and the boundary wall of the inner recess 86 have wedge surfaces 90, 92 which are complementary to one another and via which the radial movement of the claw part 88 can be converted into an axial clamping movement between tool shank 14 and connecting sleeve 20. The intermediate member 30" in these embodiments is designed as a plunger which is arranged in a non-rotatable manner in the interior of the connecting sleeve 20 and the tool shank 14, has a complementary wedge surface 96', 96" bearing against an inner wedge surface 94', 94" of the clamping claw 24" and is axially displaceable indirectly via the actuating nut 26 between a release position and a clamping position. In this case, the actuating nut 26 is coupled to the plunger-shaped intermediate member 30" via a transverse bolt 102 which passes through elongated holes 98, 100, oriented in an axially parallel manner, in the boundary wall and in the claw-shaped clamping elements 24". In the exemplary embodiments shown in FIGS. 7 to 9, two claw-shaped clamping elements 24" diametrically opposite one another are provided in each case.

In the exemplary embodiments shown in FIGS. 7 to 9, the tool shank 14 is designed as a hollow taper which can be inserted into the correspondingly tapered recess 18 of the connecting sleeve 20. In the region of its root, the tool shank 14 is defined by an annular surface 34, against which the end face 36 of the connecting sleeve 20 bears in the clamped state of the tool 10. In order to be able to release the frictional connection between tool shank 14 and connecting sleeve 20 during the tool change, the intermediate member 30" designed as plunger is at the same time designed as an ejector which is effective during the release operation. For this purpose, the plunger 30" has an ejector head 106 bearing against an inner surface 104 of the tool shank 14.

Figure 7A:
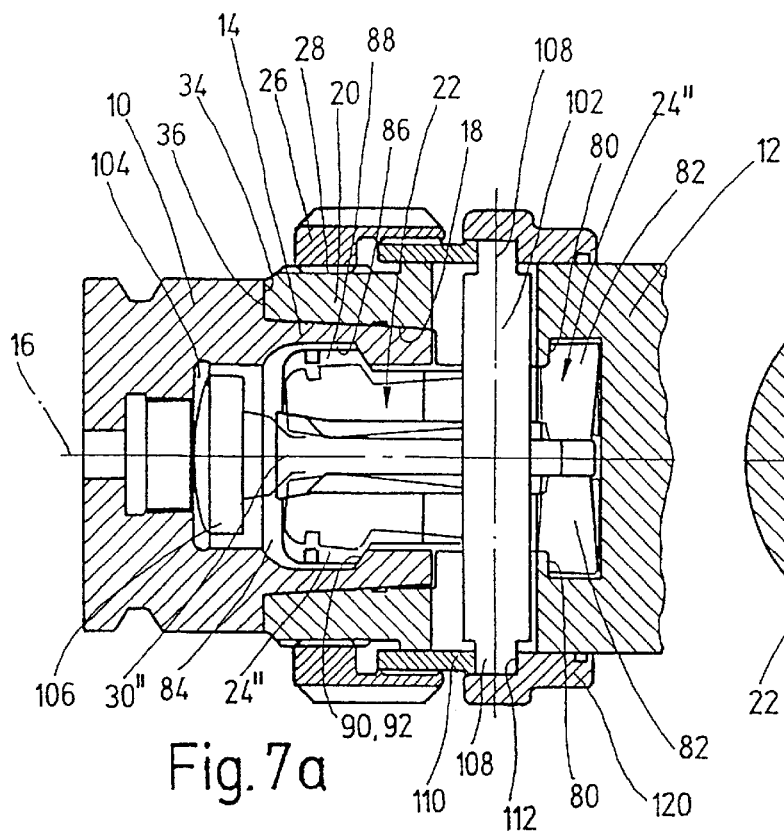
FIGS. 7a and 7b show a longitudinal section and a cross section through a coupling device modified compared with FIGS. 1 to 6 for tools with internal clamping elements which can be actuated via an actuating nut and a transverse rod.

In the exemplary embodiments shown in FIGS. 7 to 9, the transverse bolt 102 is mounted with its ends 108 in a thrust ring 110 which is guided in a non-rotatable manner on the outer surface of the connecting sleeve 20 and in such a way as to be axially displaceable via the actuating nut 26. In this case, the thrust ring, in accordance with FIGS. 7a, 8a, 8c and 9a, may have two diametrically opposite recesses 112 for accommodating the transverse-bolt ends 108. In the case of FIGS. 8b and d, the thrust ring 110, which overlaps the transverse-bolt ends 108 on the outside, is connected in each case via a radial pin 114 to the transverse-bolt ends 108.

Figure 7B:
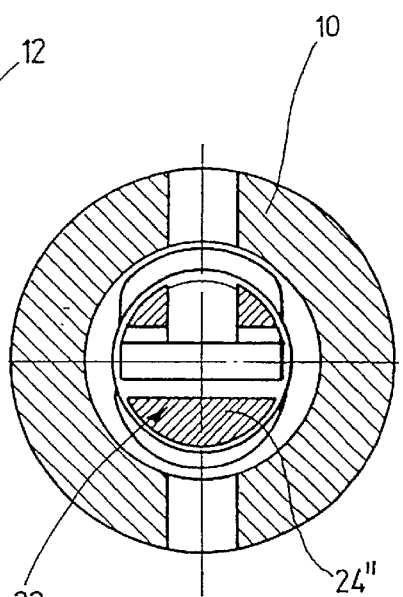
Figure 7C:
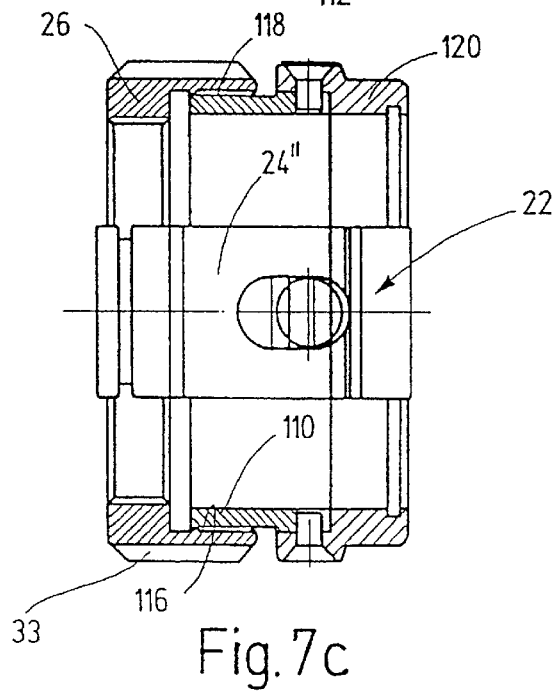
FIG. 7c shows the actuating mechanism according to FIG. 7a in partially sectioned representation.

In addition, in the exemplary embodiment according to FIGS. 7a to c, the thrust ring 110 has an external thread 118 interacting with a further thread 116 of the actuating nut 26 and is rigidly connected to a pull ring 120 arranged on that side of the transverse bolt 102 which is axially opposite the actuating nut. These measures achieve the effect that the transverse bolt is driven axially via the actuating nut both in the clamping direction and in this direction.

Figure 8A:
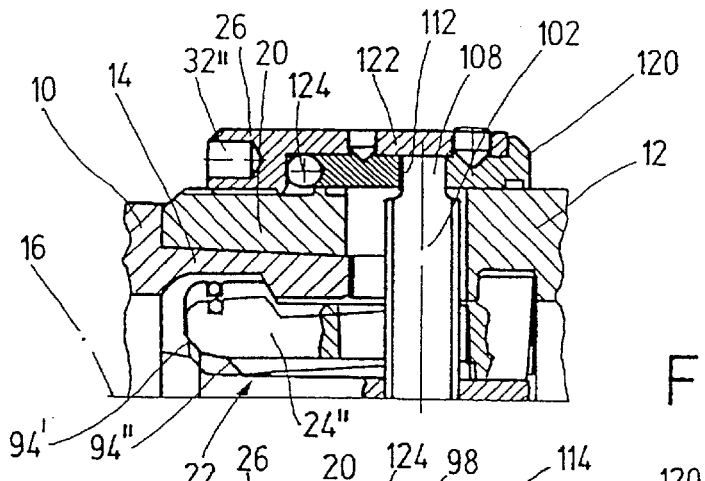
FIGS. 8a to 8d each show a clamping mechanism in a half view in accordance with FIG. 7a, with different embodiment variants of the actuating mechanism having an actuating nut and a transverse rod.
Figure 8B:
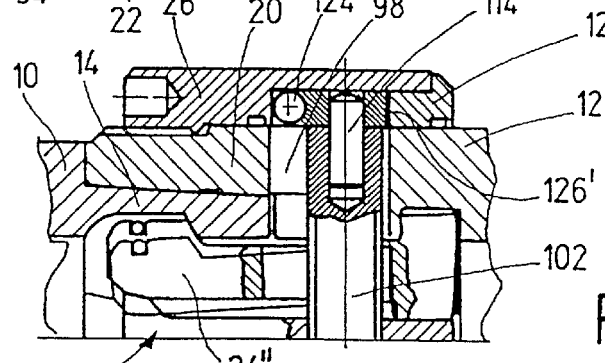
Figure 8C:
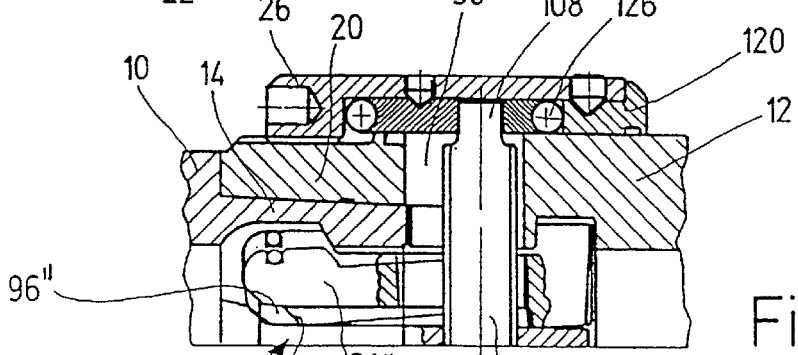
Figure 8D:
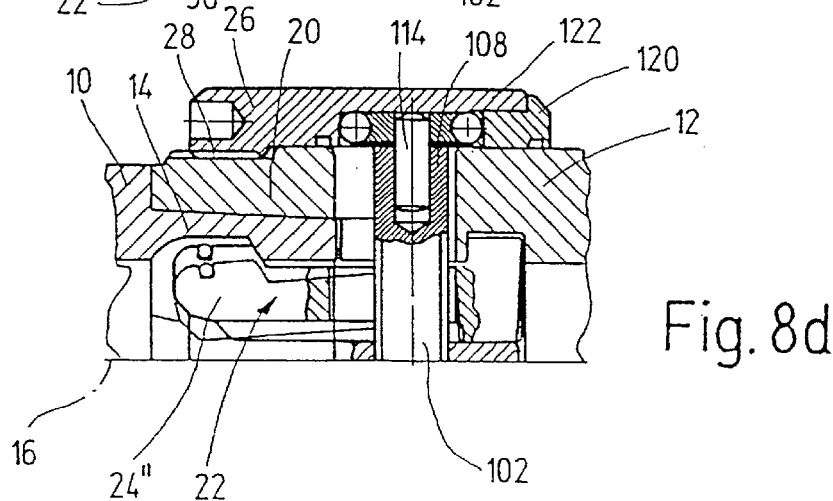
Figure 9A:
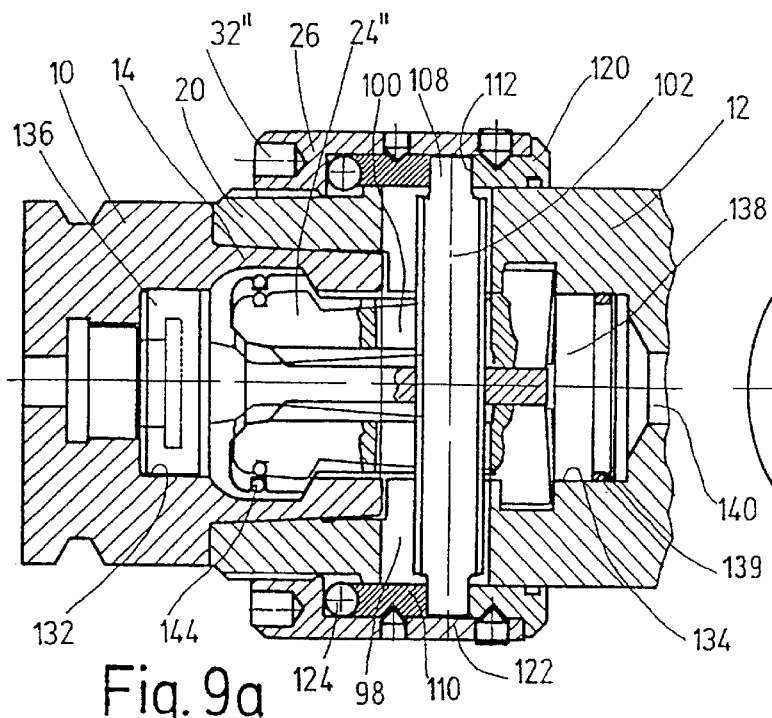
FIG. 9a shows a representation of the clamping mechanism according to FIG. 7a, with a further embodiment variant of the actuating mechanism having an actuating nut and a transverse rod.
Figure 9B:
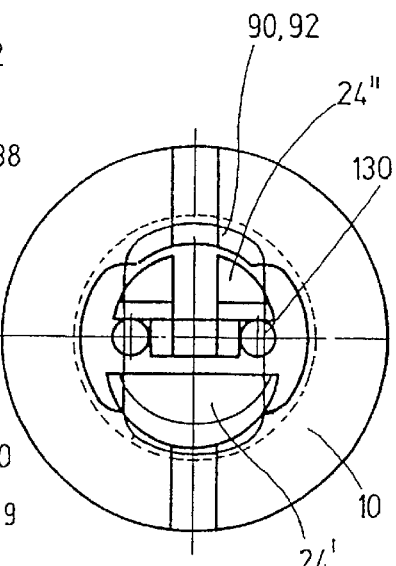
FIGS. 9c, 9d and 9e show three different side views of the clamping mechanism of the coupling device according to FIG. 9a in partially sectioned representation.
Figure 9C:
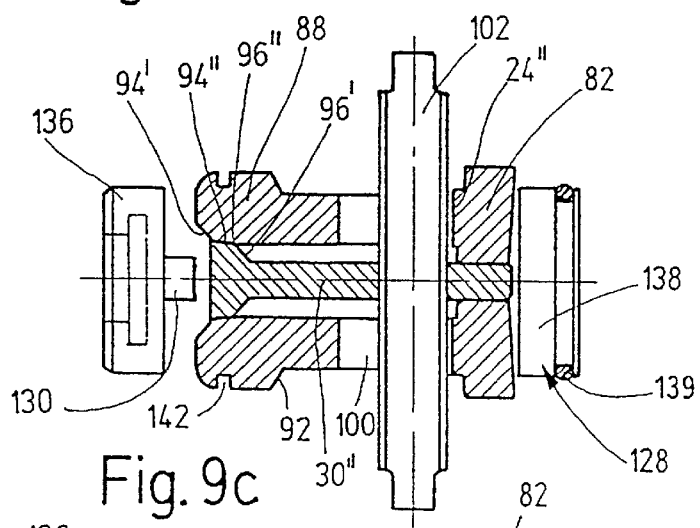
Figure 9D:
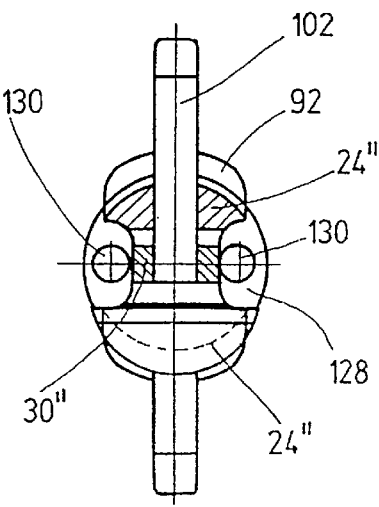
Figure 9E:
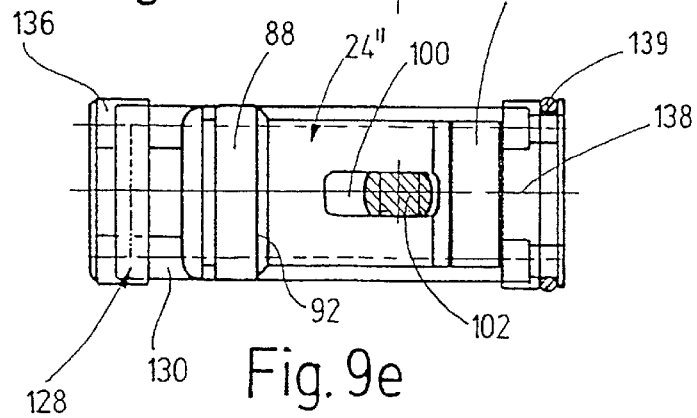

In the exemplary embodiments shown in FIGS. 8a to d and 9, the actuating nut has an annular extension 122 axially overlapping the thrust ring 110. On that side of the transverse bolt 102 which is axially opposite the actuating nut, the annular extension is connected to a pull ring 120 driving the transverse bolt in the release direction. In each case a supporting bearing 124 designed as a rolling-contact bearing is arranged between the actuating nut 26 and the thrust ring 110. In the case of FIGS. 8c and d, a supporting bearing 126 designed as a rolling-contact bearing is also located between the pull ring 120 and the thrust ring 110, whereas in FIGS. 8a, 8b and 9a supporting bearings 126' designed as plain bearings are arranged between pull ring 120 and thrust ring 110.

The inner wedge surfaces 94', 94" of the claw-shaped clamping elements 24", on the one hand, and the associated wedge surfaces 96', 96" of the plunger-shaped intermediate member 30" have a steeper adjusting bevel 94', 96' and a flatter clamping bevel 94", 96" with regard to the displacement direction of the intermediate member 30".

As can be seen from FIGS. 9b to e, the clamping claws 24" can be arranged with axial clearance in a centering cage 128 which has two pistons 136, 138 which are connected to one another by coolant tubes 130 and each engage in a respective cylindrical recess 132, 134 of the tool shank 14 and the connecting sleeve 20. Via a central bore 140 of the machine spindle 12, a cooling lubricant can be admitted to the coolant tubes 130 passing through the pistons. The piston 138 is sealed off from the spindle-side cylindrical recess 134 by a radial seal 139 (cf. FIGS. 9a, c, e).

In FIGS. 7a, 8a to d and 9a, the coupling devices are shown in their clamping position. To release the coupling device, the actuating nut is rotated in the release direction, for example via the engagement points 32', 32", so that it is displaced together with the transverse bolt 102 and the intermediate member 30" in the direction of the tool shank. In the process, the claw parts 88 of the claw-shaped clamping elements 24", via a spring ring 144 inserted into the circumferential groove 142, are moved radially inward until their wedge surfaces 92 clear the displacement path for the tool shank 14. At the same time, the tool shank 14 is released from the connecting sleeve 20 via the ejector head 106. The replacement with a new tool is effected in the reverse order by the tool 10, with actuating nut 26 slackened, first of all being inserted with its tool shank 14 into the recess 18 of the connecting sleeve 20. If the actuating nut is subsequently actuated in the clamping direction, the claw parts 88, under the wedge effect of the intermediate member 30", pass into the inner recess 86 of the tool shank until the wedge surfaces 90, 92 are pressed against one another with clamping being effected axially.

In summary, the following may be emphasized: the invention relates to a device for releasably connecting a tool 10 to a machine spindle 12. The tool has a tool shank 14 which is possibly of hollow design, whereas the machine spindle has a connecting sleeve 20 with a recess 18 for accommodating the tool shank. Located in the region between tool shank 14 and connecting sleeve 20 is a clamping mechanism 22 which has at least one essentially radially movable clamping element 24", the radial movement of which can be converted, in the manner of a wedge drive, into an axial clamping movement between tool shank 14 and connecting sleeve 20. According to the invention, the clamping mechanism comprises an actuating nut 26 which is screwed onto an external thread 28, coaxial to the spindle axis, of the connecting sleeve 20 and the axial movement of which, during the clamping operation, with at least one intermediate member 30" in between, can be converted into the radial movement of the clamping element 24".

What is claimed is:

1. A device for releasably connecting a tool to a machine spindle, comprising a tool shank projecting on the tool, a connecting sleeve projecting on the spindle coaxially to the spindle axis and having a recess for accommodating the tool shank, and a clamping mechanism which engages in the region between the tool shank and the connecting sleeve and has an essentially radially movable clamping bolt, the radial movement of the clamping bolt being convertable in the manner of a wedge drive into an axial clamping movement between the tool shank and the connecting sleeve, the clamping mechanism having an actuating nut screwed onto an external thread, coaxial to the spindle axis, of the connecting sleeve, the axial movement of the connecting sleeve, during the clamping operation, with an axially displaceable intermediate ring arranged in a non-rotatable manner on the outside of the connecting sleeve and disposed between the actuating nut and the clamping bolt, being convertable into the radial movement of the clamping bolt, the clamping bolt being radially guided in a guide bore passing through a sleeve wall of the connecting sleeve and having a bolt wedge surface at an end projecting outwardly beyond the guide bore, the axially displaceable intermediate ring having an intermediate wedge surface bearing against and complementary to the bolt wedge surface of the clamping bolt, the intermediate wedge surface being defined by two lateral guide surfaces which face one another in the circumferential direction, are oriented in an axially parallel manner, laterally overlap a radially projecting end of the clamping bolt and in the process form an anti-rotation locking means for the axially displaceable intermediate ring.

2. The device as claimed in claim 1, wherein the axially displaceable intermediate ring is axially guided on the outer surface of the connecting sleeve outside the intermediate wedge surface defined by lateral guide surfaces.

3. A device for releasably connecting a tool to a machine spindle, comprising a tool shank projecting on the tool, the tool shank having a transverse bore in which a floating bolt having an internal taper is arranged in a displaceable manner, a connecting sleeve projecting on the spindle coaxially to the spindle axis and having a recess for accommodating the tool shank, and a clamping mechanism which engages in the region between the tool shank and the connecting sleeve and has an essentially radially movable clamping bolt, the radial movement of the clamping bolt being convertable in the manner of a wedge drive into an axial clamping movement between the tool shank and the connecting sleeve, the clamping mechanism having an actuating nut screwed onto an external thread, coaxial to the spindle axis, of the connecting sleeve, the axial movement of the connecting sleeve, during the clamping operation, with an axially displaceable intermediate ring arranged in a non-rotatable manner on the outside of the connecting sleeve and disposed between the actuating nut and the clamping bolt, being convertable into the radial movement of the clamping bolt, the clamping bolt being radially guided in a guide bore passing through a sleeve wall of the connecting sleeve and having a bolt wedge surface at an end projecting outwardly beyond the guide bore, the axially displaceable intermediate ring having an intermediate wedge surface bearing against and complementary to the bolt wedge surface of the clamping bolt, the clamping bolt having a tapered extension bearing against the internal taper of the floating bolt wherein the internal taper and the tapered extension are offset axially in the clamping direction during the clamping operation.

4. A device for releasably connecting a tool to a machine spindle, comprising a tool shank projecting on the tool, a connecting sleeve projecting on the spindle coaxially to the spindle axis and having a recess for accommodating the tool shank, and a clamping mechanism which engages in the region between the tool shank and the connecting sleeve and has an essentially radially movable clamping claw, the radial movement of the clamping claw being convertable in the manner of a wedge drive into an axial clamping movement between the tool shank and the connecting sleeve, the clamping mechanism having an actuating nut coupled to a plunger-shaped intermediate member via a transverse bolt which passes through an elongated hole, oriented in an axially parallel manner, of the connecting sleeve, the actuating nut being screwed onto an external thread, coaxial to the spindle axis, of the connecting sleeve, the axial movement of the connecting sleeve, during the clamping operation, with the plunger-shaped intermediate member in between the connecting sleeve and the clamping claw, being convertable into the radial movement of the clamping claw, the clamping claw at one end having an anchor part supported on an inner shoulder of the connecting sleeve, and at the other end having a claw part which reaches into a cavity of the tool shank and is pivotable there into an inner recess of the tool shank, the claw part and a boundary wall of the inner recess having wedge surfaces which are complementary to one another and via which the radial movement of the claw part is convertible into an axial clamping movement between the tool shank and the connecting sleeve, the plunger-shaped intermediate member being arranged in a non-rotatable manner in the interior of the connecting sleeve and the tool shank having a complementary wedge surface bearing against an inner wedge surface of the clamping claw and being axially displaceable indirectly via the actuating nut between a release position and a clamping position.

5. The device as claimed in claim 4, wherein the transverse bolt passes through an elongated hole, oriented in an essentially axially parallel manner, in the clamping claw.

6. The device as claimed in claim 4, wherein the transverse bolt is mounted with its ends in a thrust ring which is guided in a non-rotatable manner on the connecting sleeve and is axially displaceable via the actuating nut.

7. The device as claimed in claim 6, wherein the thrust ring has two diametrically opposite recesses for accommodating the transverse-bolt ends.

8. The device as claimed in claim 6, wherein the thrust ring overlaps the transverse-bolt ends on the outside and is connected to each transverse-bolt end via a radial pin.

9. The device as claimed in claim 6, wherein the actuating nut has an annular extension axially overlapping the thrust ring.

10. The device as claimed in claim 9, wherein the annular extension, on a side of the transverse bolt which is axially opposite the actuating nut, is rigidly connected to a pull ring driving the transverse bolt in the release direction.

11. The device as claimed in claim 10, wherein a supporting bearing designed as an axial plain or rolling-contact, bearing is arranged between the pull ring and the thrust ring.

12. The device as claimed in claim 6, wherein a supporting bearing designed as an axial plain or rolling-contact bearing is arranged between the actuating nut and the thrust ring.

13. The device as claimed in claim 6, wherein the thrust ring has a thread interacting with a thread of the actuating nut and coaxial to the actuating nut.

14. The device as claimed in claim 13, wherein the thread of the thrust ring is an external thread and the thread of the actuating nut is an internal thread and the external thread interacts with the internal thread.

15. The device as claimed in claim 13, wherein the thrust ring and a pull ring arranged on a side of the transverse bolt which is axially opposite the actuating nut are rigidly connected to one another.

16. A device for releasably connecting a tool to a machine spindle, comprising a tool shank projecting on the tool, a connecting sleeve projecting on the spindle coaxially to the spindle axis and having a recess for accommodating the tool shank, and a clamping mechanism which engages in a region between the tool shank and the connecting sleeve and has an essentially radially movable clamping claw, the clamping claw having an anchor part at one end supported on an inner shoulder of the connecting sleeve, and at the other end has a claw part which reaches into a cavity of the tool shank and is pivotable into an inner recess of the tool shank, the claw part and a boundary wall of the inner recess having wedge surfaces which are complementary to one another and via which the radial movement of the claw part is convertible into an axial clamping movement between the tool shank and the connecting sleeve, the radial movement of the clamping claw being convertible, in the manner of a wedge drive, into an axial clamping movement between the tool shank and the connecting sleeve, wherein the clamping mechanism has an actuating nut which is screwed onto an external thread, coaxial to the spindle axis, of the connecting sleeve and the axial movement of the connecting sleeve, during the clamping operation, with a plunger-shaped intermediate member disposed between the connecting sleeve and the clamping claw is convertible into the radial movement of the clamping element, the plunger-shaped intermediate member is arranged in a non-rotatable manner in the interior of the connecting sleeve and the tool shank, the plunger-shaped intermediate member having a complementary wedge surface bearing against an inner wedge surface of the clamping claw and being axially displaceable indirectly via the actuating nut between a release position and a clamping position, wherein the clamping claw is arranged with axial clearance in a centering cage which has two pistons each of which engages in a respective cylindrical recess of the tool shank and the connecting sleeve, the pistons are connected to one another by coolant tubes which pass through the pistons and to which cooling lubricant can be admitted.

* * * * *